United States Patent
Dunleavy et al.

(10) Patent No.: US 10,016,912 B2
(45) Date of Patent: Jul. 10, 2018

(54) FIBER STRUCTURE FOR AN AXISYMMETRIC COMPONENT MADE OF COMPOSITE MATERIAL WITH A VARYING DIAMETER, AND COMPONENT COMPRISING SAME

(71) Applicants: SAFRAN, Paris (FR); AIRCELLE, Gonfreville l'Orcher (FR)

(72) Inventors: Patrick Dunleavy, Palaiseau (FR); Bertrand Desjoyeaux, Sainte Adresse (FR)

(73) Assignees: SAFRAN, Paris (FR); AIRCELLE, Gonfreville l'Orcher (FR)

( * ) Notice: Subject to any disclaimer, the term of this patent is extended or adjusted under 35 U.S.C. 154(b) by 425 days.

(21) Appl. No.: 14/761,792

(22) PCT Filed: Jan. 9, 2014

(86) PCT No.: PCT/FR2014/050028
§ 371 (c)(1),
(2) Date: Jul. 17, 2015

(87) PCT Pub. No.: WO2014/111643
PCT Pub. Date: Jul. 24, 2014

(65) Prior Publication Data
US 2015/0354103 A1 Dec. 10, 2015

(30) Foreign Application Priority Data
Jan. 17, 2013 (FR) ...................................... 13 50409

(51) Int. Cl.
*D03D 3/02* (2006.01)
*B60B 11/06* (2006.01)
(Continued)

(52) U.S. Cl.
CPC .............. *B29B 11/16* (2013.01); *B60B 11/06* (2013.01); *D03D 3/02* (2013.01); *D03D 25/005* (2013.01);
(Continued)

(58) Field of Classification Search
None
See application file for complete search history.

(56) References Cited

U.S. PATENT DOCUMENTS

2009/0325443 A1 12/2009 Blackden et al.

FOREIGN PATENT DOCUMENTS

| JP | 1-168933 A | 7/1989 |
| JP | 1-168934 A | 7/1989 |

(Continued)

OTHER PUBLICATIONS

International Search Report dated Mar. 20, 2014 in PCT/FR2014/050028 filed Jan. 9, 2014.

*Primary Examiner* — Shawn Mckinnon
(74) *Attorney, Agent, or Firm* — Oblon, McClelland, Maier & Neustadt, L.L.P.

(57) ABSTRACT

A single-piece woven fiber structure for fabricating an axisymmetric part of varying diameter made out of composite material, the fiber structure having a portion of frustoconical shape with a large diameter and a small diameter, the ratio between the large diameter and the small diameter being not less than 2. The fiber structure is formed by winding layers of warp and weft yarns that are woven on a mandrel having a profile that is defined as a function of the profile of the part to be fabricated with warp yarn take-up. For each layer of yarns, the weft yarns are angularly distributed on a single diameter in a zone of the large diameter of the portion of frustoconical shape and on at least two different diameters in a zone of the small diameter of the (Continued)

portion of frustoconical shape in order to form at least two superposed plies of weft yarns.

14 Claims, 10 Drawing Sheets

(51) Int. Cl.
*B29B 11/16* (2006.01)
*D03D 25/00* (2006.01)
(52) U.S. Cl.
CPC . *B60B 2310/241* (2013.01); *B60B 2360/3444* (2013.01); *B60Y 2200/51* (2013.01); *D10B 2101/06* (2013.01); *D10B 2101/08* (2013.01); *D10B 2505/02* (2013.01); *Y10T 428/1314* (2015.01); *Y10T 428/1362* (2015.01)

(56) References Cited

FOREIGN PATENT DOCUMENTS

| | | |
|---|---|---|
| JP | 7-216684 A | 8/1995 |
| WO | 2006/055320 A1 | 5/2006 |

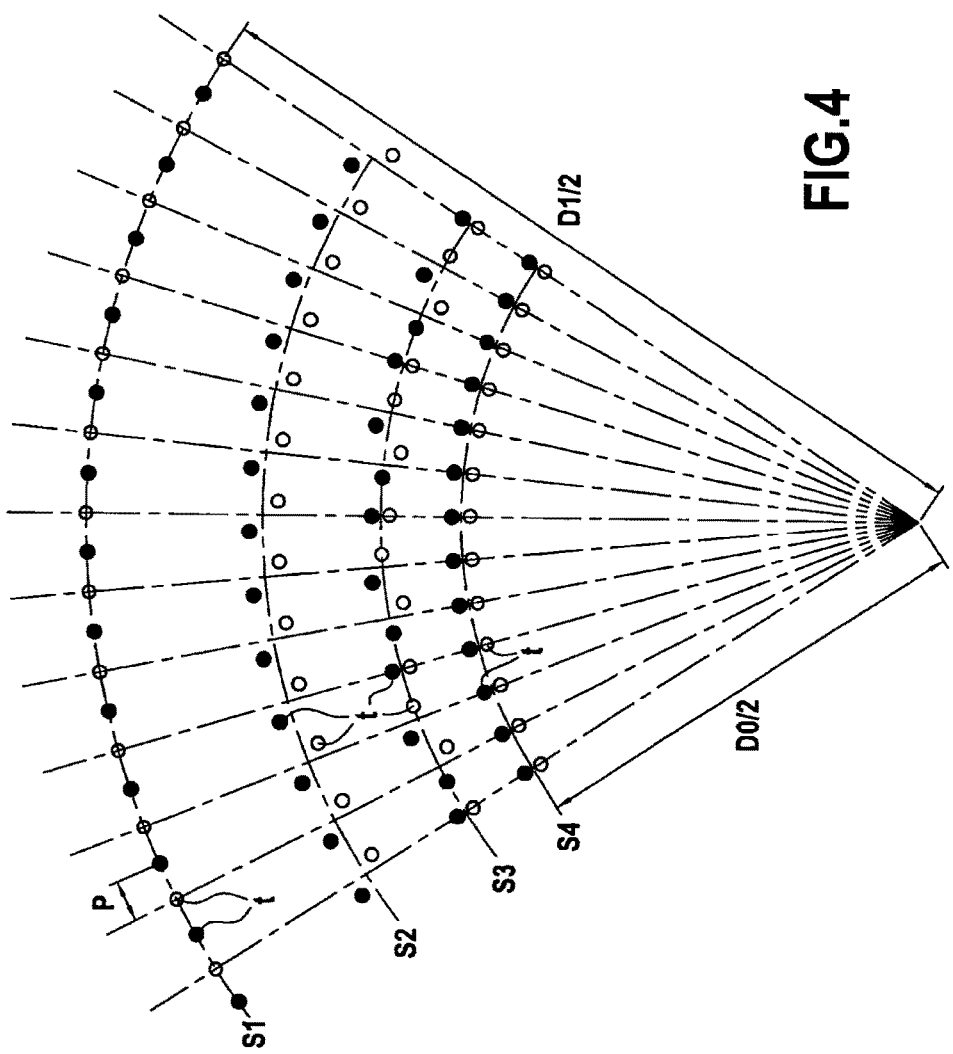

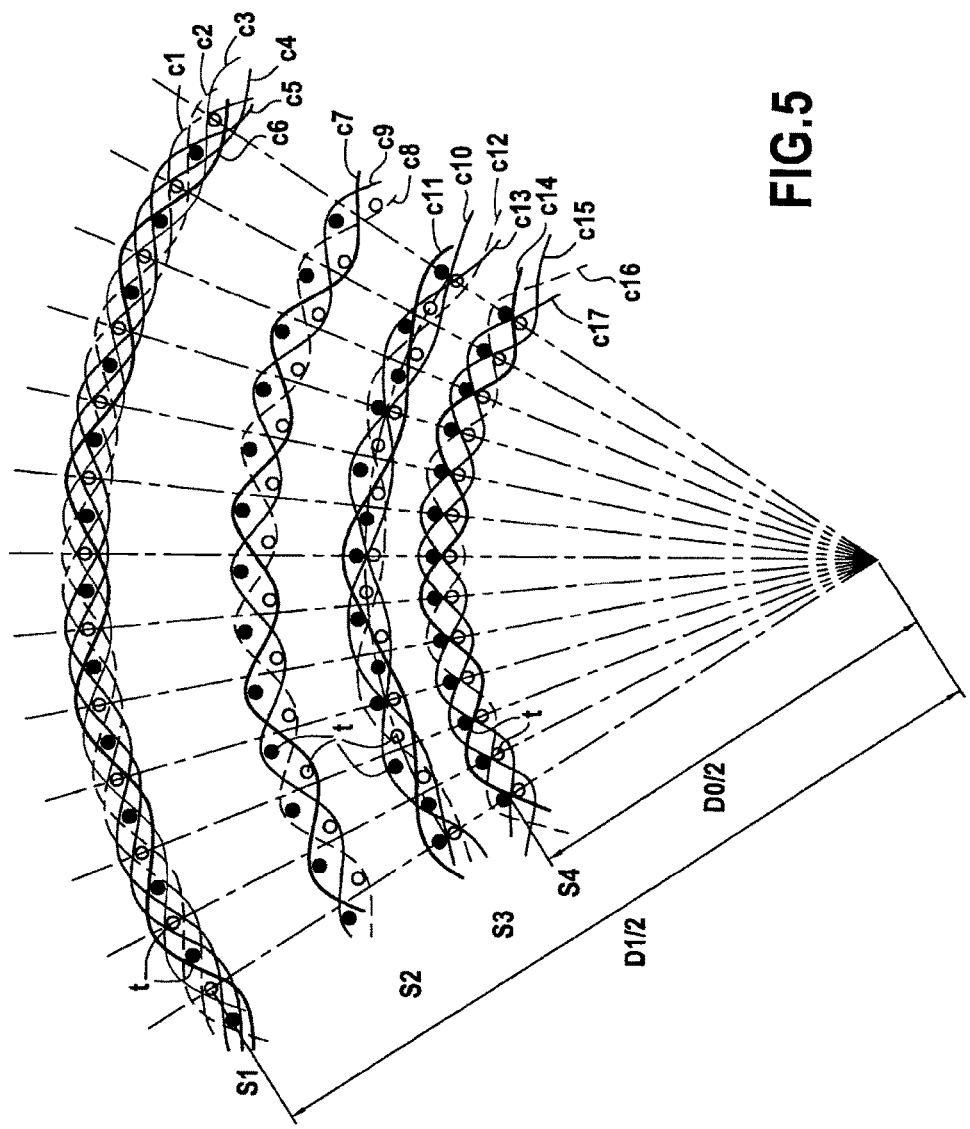

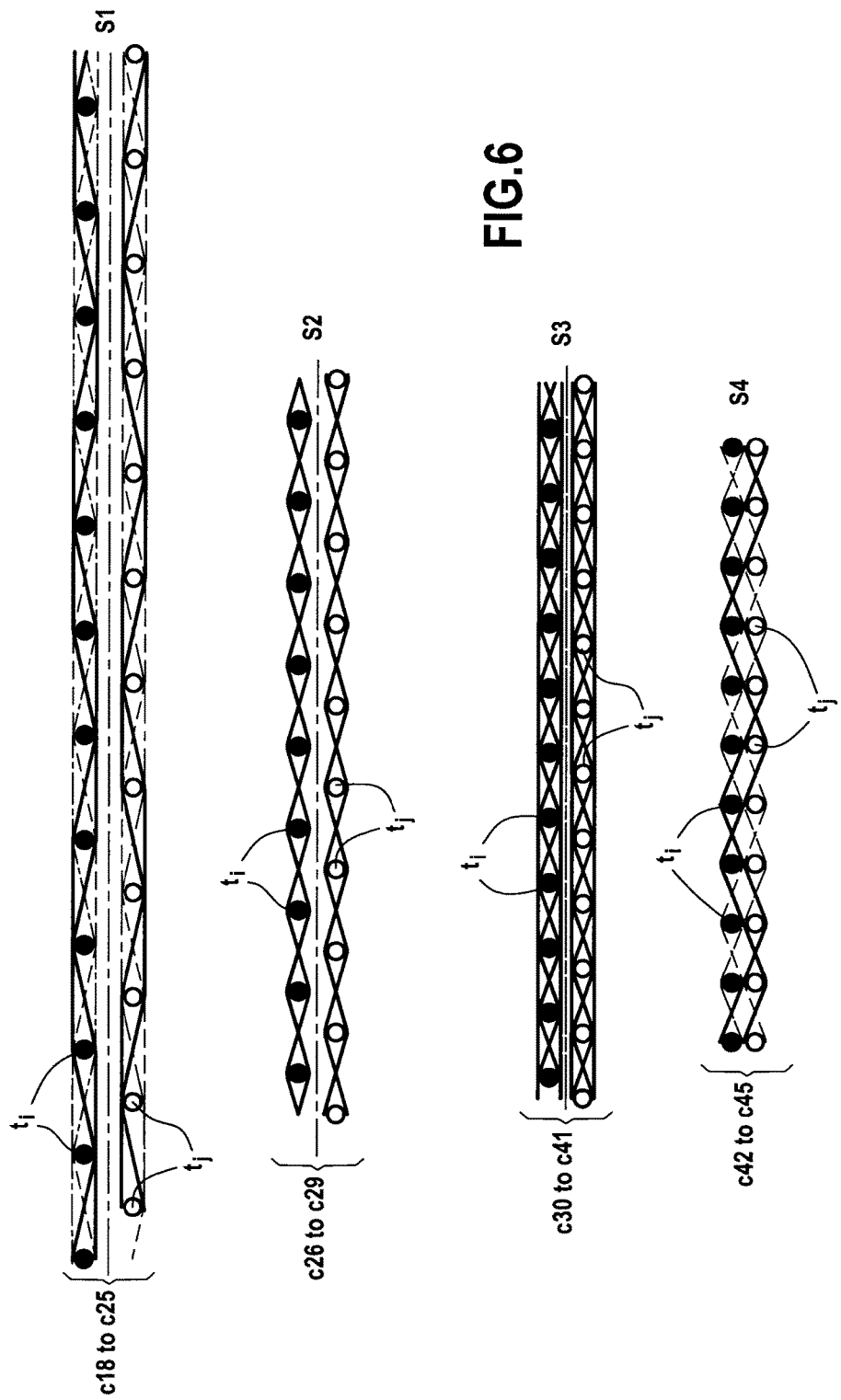

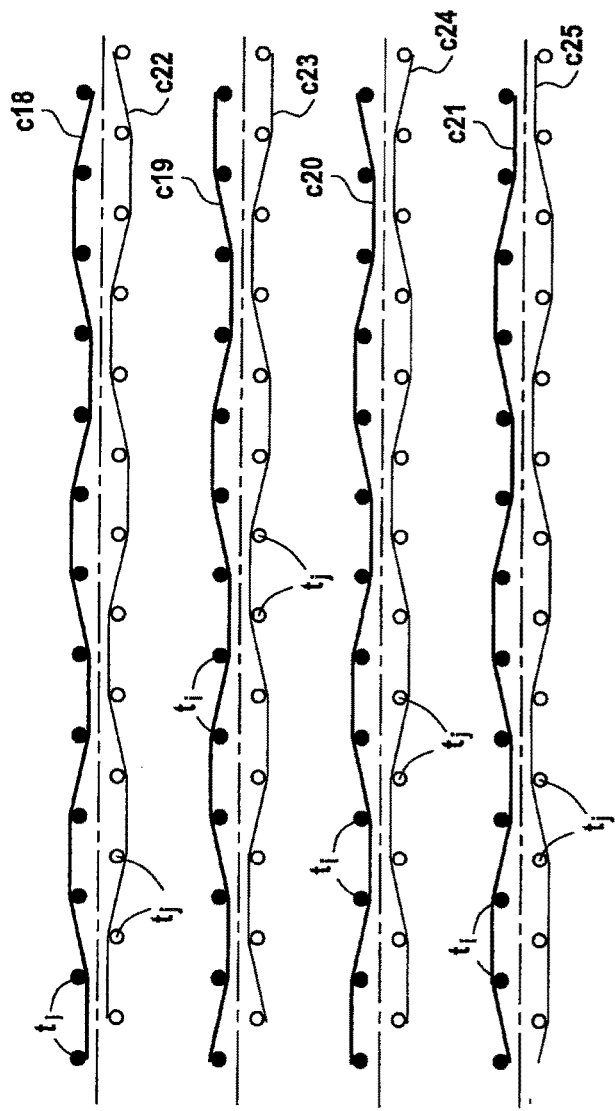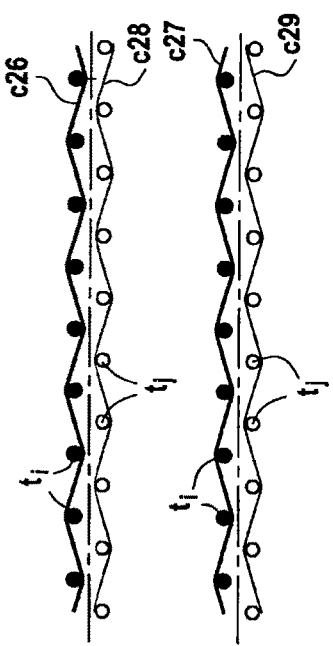

FIBER STRUCTURE FOR AN AXISYMMETRIC COMPONENT MADE OF COMPOSITE MATERIAL WITH A VARYING DIAMETER, AND COMPONENT COMPRISING SAME

BACKGROUND OF THE INVENTION

The present invention relates to making axisymmetric parts of varying diameter out of composite material, and more particularly relates to fiber structures for such parts.

An example application of the invention lies in making aircraft wheels (or rims). Another example application lies in making compressor casings for helicopter gas turbine engines.

In known manner, an aircraft wheel is made up of two portions that are fastened together so as to enable the tire to be put on the wheel and removed therefrom. Each of the two wheel-halves is in the form of an open ring of C-shaped section. The wheel also receives a brake system made up in particular of a brake disk made of composite material and housed in one of the wheel-halves.

Such aircraft wheels are typically made of aluminum, each wheel-half being obtained by forging, for example. Nevertheless, making wheels out of metal increases their weight and requires a large amount of maintenance, largely because of galvanic corrosion between the metal wheels and the brake disks made of composite material.

In order to mitigate such a drawback, proposals have been made to make the wheel-halves making up an aircraft wheel out of composite material comprising fiber reinforcement densified by a matrix. More precisely, the fiber reinforcement of a wheel-half is formed by a fiber structure that can be woven or braided as a single piece by so-called "contour weaving" on a forming mandrel having a portion of frustoconical shape. Various geometrical transformations are then applied to the fiber structure in order to bring it into the shape of an open ring of C-shaped section, corresponding to a fiber preform for an aircraft wheel-half. The fiber preform as obtained in this way is then densified by a matrix in order to form an aircraft wheel-half, e.g. by using resin transfer molding (RTM). Reference may thus be made to the French application No. 12/58720 filed on Sep. 18, 2012, which describes implementations of such a fabrication method.

Making a fiber preform for an aircraft wheel-half by means of such a method is perfectly possible when the ratio between the large diameter and the small diameter of the frustoconical portion of the fiber structure woven or braided on the forming mandrel is close to 1. With such a ratio, it is possible to obtain a fiber content of the order of 55% to 60% that is uniform throughout the preform, thereby imparting thereto structural strength that is satisfactory for the intended application.

In contrast, when the ratio between the large diameter and the small diameter of the frustoconical portion of the fiber structure is not less than 2, it becomes difficult using the method of French patent application No. 12/58720 to obtain a sufficiently high fiber content that is uniform throughout the preform. The increase in the ratio between the diameters of the fiber structure has the consequence of increasing the spacing between adjacent weft yarns in the large diameter thereof. This results in a fiber content that is not uniform throughout the preform.

In order to remedy that problem, it is possible to provide additional weft yarns in the large diameter zone and to interrupt them going towards the small diameter zone. Nevertheless, that solution is not satisfactory for the strength of the part that is made.

OBJECT AND SUMMARY OF THE INVENTION

The present invention seeks to propose a fiber structure woven as a single piece for fabricating an axisymmetric part of varying diameter out of composite material, but that does not present the above-mentioned drawbacks.

This object is achieved by a fiber structure having a portion of frustoconical shape with a large diameter and a small diameter, the ratio between the large diameter and the small diameter being not less than 2, the fiber structure being formed by winding layers of warp and weft yarns that are woven on a mandrel having a profile that is defined as a function of the profile of the part to be fabricated with warp yarn take-up, the structure being characterized in that for each layer of warp and weft yarns, the weft yarns are distributed angularly on a single diameter in a zone of the large diameter of the portion of frustoconical shape of the fiber structure and on at least two different diameters in a zone of the small diameter of the portion of frustoconical shape of the fiber structure in order to form at least two superposed plies of weft yarns.

The fiber structure of the invention presents a particular distribution of weft yarns in which, for each layer of yarns, the weft yarns are distributed over a single diameter in a zone of the large diameter and over at least two superposed plies of weft yarns in a zone at the small diameter. Starting from a desired fiber content at the large diameter of the fiber structure (e.g. of the order of 55% to 60%), it is possible to deduce therefrom a particular spacing for the weft yarns at the large diameter. The excess of weft yarns that result from the narrowing of the frustoconical portion of the fiber structure at its small diameter can then be shifted into the thickness direction at this small diameter by superposing the weft yarns. It is thus possible to obtain a fiber content per layer that is uniform throughout the width of the fiber structure.

Furthermore, in an application to making fiber reinforcement for fabricating an aircraft wheel-half, the increase in the thickness of the fiber structure at the small diameter that results from superposing weft yarns corresponds to a mechanical strength requirement in this portion of the fiber structure which, after shaping and densification, is to constitute a portion of the hub of the wheel. The load that is applied to the axle of the wheel requires a greater thickness of composite material than in the remainder of the wheel.

In an implementation of the weaving of the weft yarns in the zone of the small diameter of the fiber structure, for each layer of yarns, the two plies of weft yarns distributed in the zone of the small diameter of the portion of frustoconical shape are interlinked by a single layer of warp yarns.

In this implementation, the warp yarns interlinking two plies of weft yarns distributed in the zone of the small diameter of the portion of frustoconical shape are woven using an interlock type weave.

In another implementation of the weaving of the weft yarns in the zone of the small diameter of the fiber structure, for each layer of yarns, each of the plies of weft yarns distributed in the zone of the small diameter of the portion of frustoconical shape is interlinked by a single layer of warp yarns. Thus, the excess weft yarns at the small diameter of the fiber structure are interlinked so as to form at least two mutually independent layers. Such an implementation makes it possible to apply geometrical deformations to the structure, in particular in order to give it the shape of a wheel-half.

In this implementation, the warp yarns interlinking each ply of weft yarns distributed in the zone of the small diameter of the portion of frustoconical shape are woven using a weave of plain, serge, or satin type.

In an implementation of the weaving of the weft yarns in the zone of the large diameter of the fiber structure, in each layer of fabric, the layer of weft yarns distributed in the zone of the large diameter of the portion of frustoconical shape are interlinked by a single layer of warp yarns.

In this implementation, the warp yarns interlinking the weft yarns distributed in the zone of the large diameter of the portion of frustoconical shape are woven using a weave of plain, serge, or satin type.

In another implementation of the weaving of the weft yarns in the zone of the large diameter of the fiber structure, for each layer of yarns, the weft yarns distributed in the zone of the large diameter of the portion of frustoconical shape are interlinked by two independent layers of warp yarns.

In this implementation, the warp yarns interlinking the weft yarns distributed in the zone of the large diameter of the portion of frustoconical shape are woven using a weave of plain, serge, or satin type.

Furthermore, for each layer of yarns, the weft yarns distributed between the large diameter and the small diameter of the portion of frustoconical shape of the fiber structure are interlinked by one or more layers of warp yarns. These layers constitute the transition between the large and small diameters of the portion of frustoconical shape of the fiber structure.

The warp yarns in a given layer of warp yarns interlinking weft yarns between the large diameter and the small diameter of the portion of frustoconical shape may be woven using a weave of plain or serge type.

The invention also provides a part made of composite material having fiber reinforcement densified by a matrix, wherein the fiber reinforcement is formed by a fiber structure as defined above. This part may constitute an aircraft wheel-half.

The invention also provides a method of weaving as a single piece a fiber structure as defined above, the method comprising winding a plurality of layers of warp and weft yarns on a mandrel having a profile that is defined as a function of the profile of the part to be fabricated with warp yarn take-up.

BRIEF DESCRIPTION OF THE DRAWINGS

Other characteristics and advantages of the present invention appear from the following description made with reference to the accompanying drawings, which show implementations having no limiting character. In the figures:

FIG. 4 is a diagram showing the distribution of weft yarns in various sections of the fiber structure of FIGS. 2 and 3;

FIG. 5 is a view corresponding to FIG. 4 in which the weft yarns are interlinked by warp yarns in a first weaving implementation;

FIG. 6 is a flat representation of a second implementation for weaving weft yarns having the FIG. 4 distribution with warp yarns;

FIGS. 7A to 7D show the weaving patterns of FIG. 6 in greater detail;

DETAILED DESCRIPTION OF THE INVENTION

Figure 1:
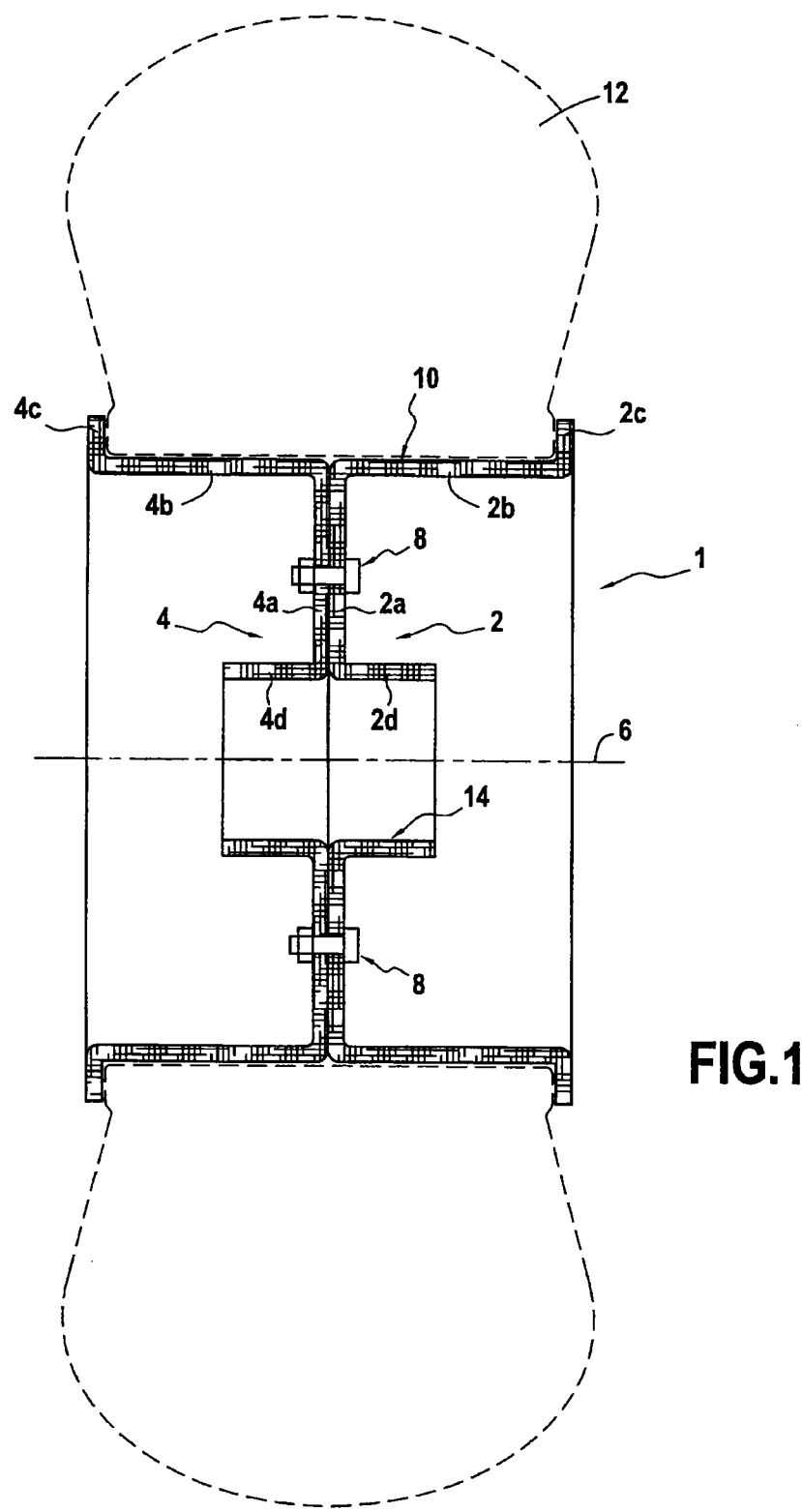
FIG. 1 is a section view of an aircraft wheel.

The field of application of the invention is that of making fiber structures suitable for constituting fiber reinforcement, or preforms, for fabricating axisymmetric parts out of composite material and of varying diameter (i.e. having at least two different diameters), such as compressor casings for helicopter gas turbine engines or aircraft wheels of the kind shown in FIG. 1.

The aircraft wheel 1 shown in this Figure is made up in particular of two wheel-halves 2, 4, each of axisymmetric shape and each in the form of an open ring having a C-shaped section. The wheel-halves 2, 4 are centered on a common axis of rotation 6 and they are fastened to each other via their respective end walls 2a, 4a, e.g. by means of nut-and-bolt type fasteners 8.

Each wheel-half 2, 4 has a large diameter 2b, 4b of outside surface that defines the rim 10 of the wheel. At their free ends, these large diameters have respective outwardly-projecting flanges 2c, 4c, these two flanges serving to retain a tire 12 axially on the rim 10.

Each wheel-half 2, 4 also presents a small diameter 2d, 4d that is concentric with the large diameter 2b, 4b, these small diameters forming the interface 14 with the axle of the wheel.

Each wheel-half is fabricated from fiber reinforcement, also referred to as a "preform", that is densified with a matrix. The fiber reinforcement of the wheel-halves is obtained from a fiber structure of the kind shown in FIG. 2, which structure is subsequently subjected to geometrical deformations in order to bring it into the shape of a wheel-half, as shown in FIG. 3.

Figure 2:
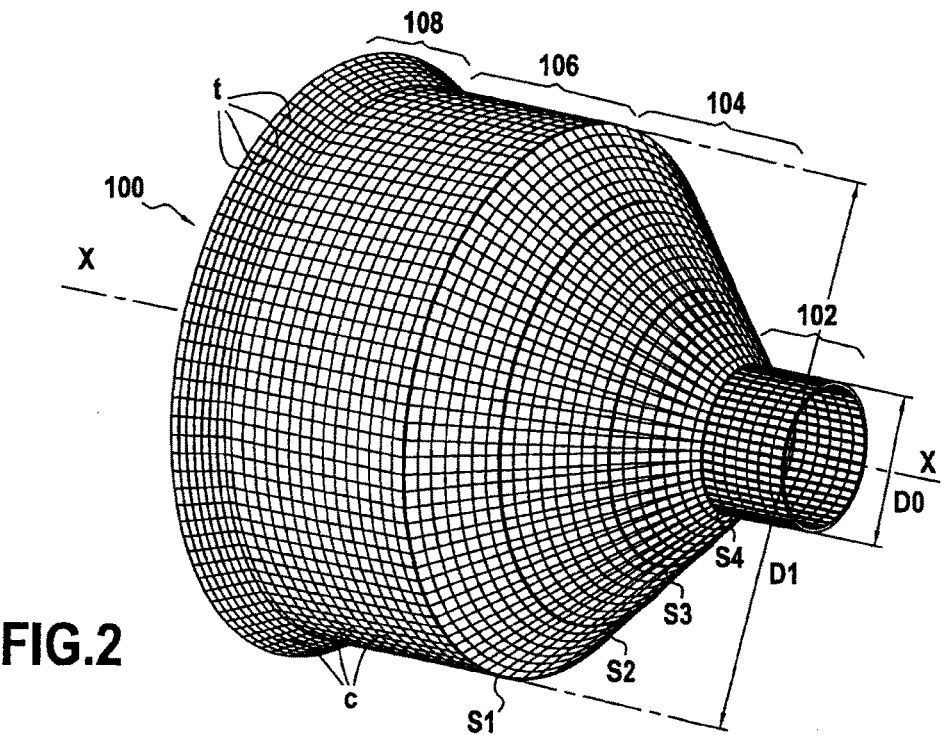
FIG. 2 is a perspective view of an example fiber structure in accordance with the invention suitable for use in fabricating an aircraft wheel-half.

The fiber structure 100 shown in FIG. 2 is of axisymmetric shape centered on an axis X-X. Going from right to left in FIG. 2, it comprises in particular a first cylindrical portion 102 of diameter D0, a frustoconical portion 104 having a small diameter D0 and a large diameter D1, and a second cylindrical portion 106 with a diameter D1. At its end remote from the first cylindrical portion 102, the fiber structure is terminated by another frustoconical portion 108 having a large diameter that is slightly greater than the diameter D1. It can be seen that the ratio D1/D0 is equal to 2.

Figure 3:
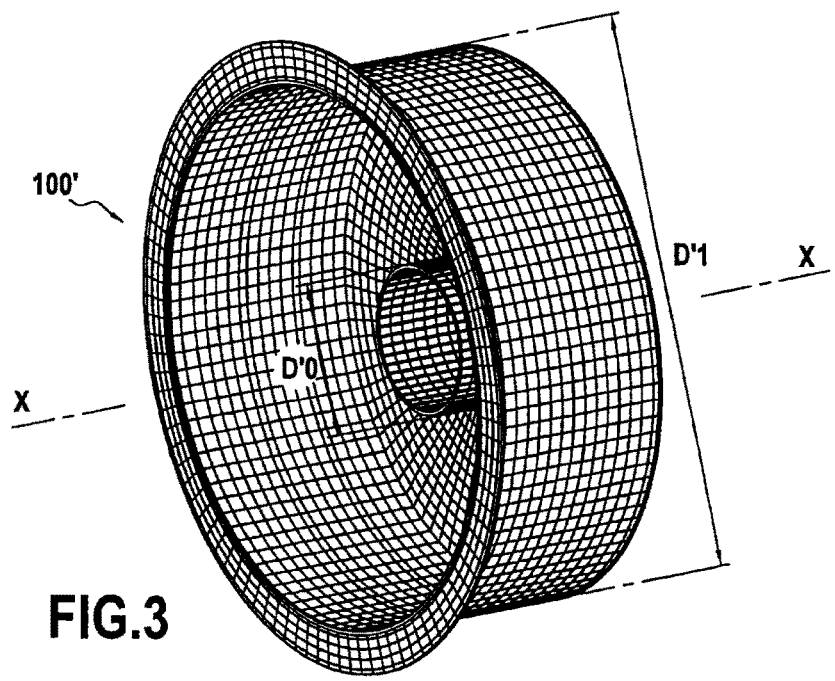
FIG. 3 is a perspective view of the FIG. 2 fiber structure after being subjected to geometrical deformations in order to put into the shape of an aircraft wheel-half.

Various geometrical deformations are then applied to the fiber structure in order to bring it into the shape of the fiber reinforcement 100' for an aircraft wheel-half as shown in FIG. 3. These geometrical deformations are described in detail in French patent application No. 12/58720 filed on Sep. 18, 2012, the content of which is incorporated herein by way of reference. In particular, in order to give it the shape shown in FIG. 3, the fiber structure 100 of FIG. 2 is opened radially so that its diameters D0 and D1 become respective diameters D'0 and D'1, and it is turned inside out so as to obtain a geometrical shape corresponding to that of the fiber reinforcement 100'.

After these geometrical deformations, it can be seen that the first cylindrical portion of diameter $D'0$ of the fiber structure is to constitute the hub of the wheel-half that is to be fabricated, the frustoconical portion is to constitute the end wall of the wheel-half, the second cylindrical portion of diameter $D'1$ is to constitute the rim of the wheel-half, and the other frustoconical portion at the end of the fiber structure is to constitute the tire-retaining flange of the wheel-half.

After a possible stage of cutting and/or compacting, the fiber reinforcement 100' of the aircraft wheel-half shown in FIG. 3 is subsequently subjected to a step of being densified with a matrix. By way of example, for applications at temperatures mainly below 450° C., it is preferable to use carbon fibers or glass fibers (or a combination of such fibers), together with an organic resin such as an epoxy resin, a polybismaleimide (BMI) resin, a cyanate-ester resin, a benzoxazine resin, a phenolic resin, a polyimide resin, or indeed a vinylester resin (or any modification of these resins). By way of example, the densification may be performed by resin transfer molding (RTM).

There follows a description of how the fiber structure 100 in accordance with the invention is obtained.

The fiber structure 100 is typically obtained by so-called "contour weaving". Contour weaving is a known technique for weaving a fiber texture having an axisymmetric shape, in which the fiber structure is woven on a mandrel with take-up of warp yarns, the mandrel presenting an external profile that is defined as a function of the profile of the fiber texture that is to be made.

In the application to weaving the fiber structure 100 of FIG. 2, the mandrel (not shown) presents an external profile that fits closely to the profile of the fiber structure, i.e. it possesses a first cylindrical portion of diameter $D0$, a frustoconical portion having a small diameter $D0$ and a large diameter $D1$, a second cylindrical portion with a diameter $D1$, and an end frustoconical portion with a large diameter that is slightly greater than $D1$. It should be observed that the ratio $D1/D0$ of the large diameter $D1$ over the small diameter $D0$ of the frustoconical portion of the mandrel is equal to or greater than 2.

With such a weaving technique, the fabric made up of a layer of warp yarns interlinked with weft yarns is made by a loom and then wound in a plurality of layers on the mandrel. The warp yarns of the fabric extend over the mandrel in circumferential directions and therefore need to be of lengths that differ depending on their location on the mandrel. As for the weft yarns, they are inserted in the fabric along axial directions at controlled angles.

Each layer of the fiber structure 100 as obtained in this way presents an architecture of warp yarns c extending in circumferential directions that are interlinked with weft yarns t, the weft yarns extending in axial directions. Several layers of fabric may be needed in order to obtain a fiber structure of desired thickness.

For each layer of warp and weft yarns in the fiber structure, FIG. 4 shows the angular distribution of the weft yarns t over an angular sector depending on their location along the frustoconical portion of the fiber structure (i.e. between the small and large diameters thereof). In this figure, the weft yarns t are represented in section by dots on four different sections $S1$ to $S4$. The locations of these sections $S1$ to $S4$ along the fiber structure are shown in FIG. 2.

In this example of weft yarn distribution, the ratio $D1/D0$ between the large diameter $D1$ and the small diameter $D0$ of the frustoconical portion of the fiber structure is selected to be equal to 2.

As shown in FIG. 4, in the zone of the large diameter $D1$ of the fiber structure (section $S1$ at $D1/2$ [i.e., half the large diameter $D1$]), the weft yarns t of each layer of yarns are spaced apart (in the circumferential direction) at a constant pitch P that is selected in particular so as to obtain the desired fiber content for the fiber reinforcement. These weft yarns are, in particular, angularly distributed over a common diameter of the fiber structure so as to form a single thickness (the weft yarns are arranged one beside another on the common diameter).

On approaching the small diameter $D0$ of the fiber structure (sections $S2$ and $S3$), these same weft yarns t will tend to move closer to one another until they are angularly distributed on two different diameters in the zone of the small diameter $D0$ (section $S4$ at $D0/2$ [i.e., half the small diameter $D0$] in FIG. 4), thereby forming two plies (or thicknesses) superposed one on the other.

Various implementations are provided for interlinking the weft yarns by warp yarns in each layer of yarns forming the fiber structure.

In the first implementation shown in FIG. 5, the weft yarns of each layer of yarns are woven with warp yarns so as to form a single thickness of yarns.

In the section $S1$ (large diameter $D1$ of the fiber structure), the weft yarns t are thus interlinked by a single layer of warp yarns $c1$ to $c6$. The resulting fabric thus has one layer of weft yarns and one layer of warp yarns.

More precisely, in this FIG. 5 implementation, the warp yarns $c1$ to $c6$ interlinking the weft yarns t of this layer in the section $S1$ are woven using a three-up, three-down serge weave (six successive weave planes are needed to describe this weave pattern in full).

In the section $S4$ corresponding to the small diameter $D0$ of the fiber structure, the weft yarns t distributed in two superposed plies are interlinked by a single layer of warp yarns $c14$ to $c17$ using an interlock type weave (i.e. in a right section normal to the axial of symmetry of the fiber structure, only one warp yarn is visible). In FIG. 5, four successive weave planes are shown projected into a single view so as to describe this weave pattern in full, these planes representing four distinct and adjacent columns of weaving of warp yarns. The fabric obtained in this section $S4$ thus has a single layer of warp yarns and two layers of weft yarns interlinked by an interlock type weave.

In the section $S3$ of the fiber structure, the resulting fabric still has a single layer of warp yarns $c10$ to $c13$ with weft yarns t redistributed so as to alternate between one and two plies. In this position it is necessary to have four different weave planes in order to describe this interlock weave pattern in full.

Finally, in the section $S2$ of the fiber structure, the distribution of weft yarns is more spread out than in the section $S3$, with the weave pattern of the warp yarns $c7$ to $c9$ being modified so as to enable the weft yarns t to be distributed harmoniously over the entire surface. In this position, three different weave planes are needed to describe the interlock weave pattern in full.

FIGS. 6 and 7A to 7D show a second implementation for interlinking the warp and weft yarns in each layer of yarns forming the fiber structure in accordance with the invention.

In this second implementation, the weft yarns of each layer of yarns are woven so as to form two separate layers of fabric, with the exception of section $S4$, which corresponds to the small diameter D0 of the fiber structure, in which the weft yarns are interlinked so as to form a single layer of yarns.

In the section S1 of the fiber structure (corresponding to its large diameter), the weft yarns, still arranged over a single thickness, are thus distributed in two distinct subsets of weft yarns, namely $t_i$ and $t_j$, which are interlinked by two layers of warp yarns, respectively c18 to c21 and c22 to c25. A fabric is thus obtained having two independent layers of weft yarns.

In the implementation of FIGS. 6 and 7A, the warp yarns interlinking the weft yarns $t_i$, $t_j$ of each layer are woven with a two-up two-down serge type weave. For each of these layers of weft yarns, four different weave planes are needed in order to describe such a weave pattern in full. These successive weave planes are shown in FIG. 7A.

In the section S2 of the fiber structure, the weft yarns are likewise distributed in two distinct subsets of weft yarns $t_i$ and $t_j$ that are interlinked by two layers of warp yarns, respectively c26, c27, and c28, c29. A fabric is thus obtained having two independent layers of weft yarns.

Compared with the weave of the section S1, the warp yarns in the section S2 are woven with a plain type weave (one-up, one-down). For each of the layers of weft yarns, two different weave planes are needed to describe the weave pattern in full, as shown in FIG. 7B.

In the following section S3 of the fiber structure, the weft yarns are still closer together. These weft yarns are still distributed in two distinct subsets of weft yarns $t_i$ and $t_j$ that are interlinked by two layers of warp yarns, respectively c30 to c35 and c36 to c41. Fabric is once more obtained having two independent layers of weft yarns.

Figure 7C:
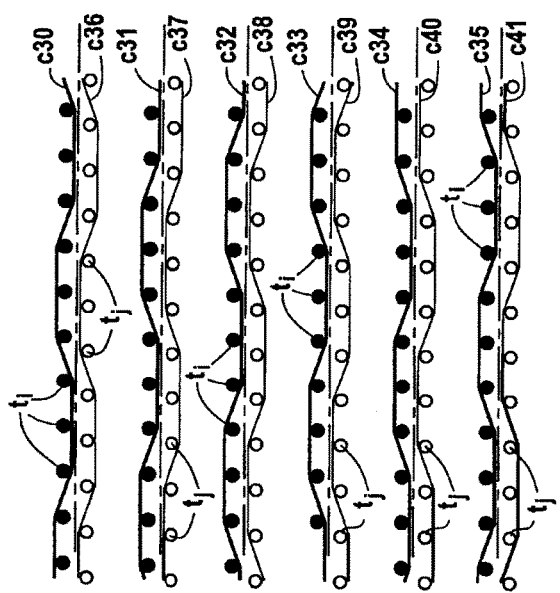

Compared with the above-described weaves for the sections S1 and S2, in this section the warp yarns are woven with a three-up, three-down serge weave. For each layer of weft yarns, six different weave planes are necessary for describing such a weave pattern in full, as shown in FIG. 7C.

Finally, in the section S4 corresponding to the small diameter of the fiber structure, the weft yarns $t_i$ and $t_j$ distributed in two superposed plies of yarns are interlinked by a single layer of warp yarns c42 to c45.

Figure 7D:
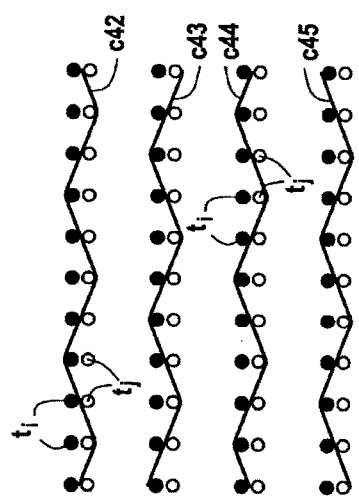
Figure 8:
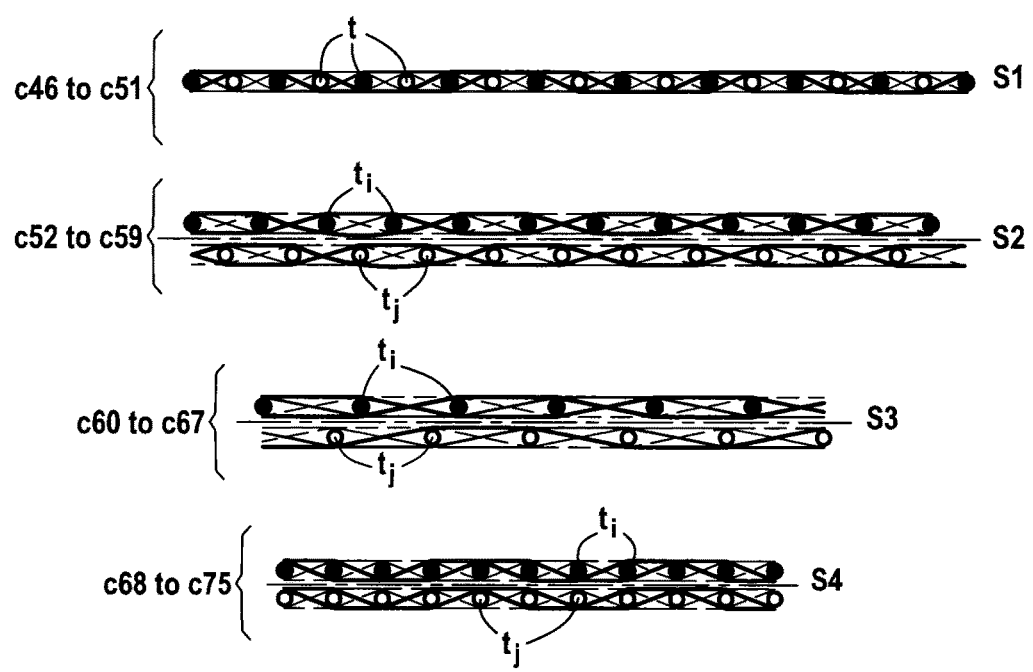
FIG. 8 is a flat representation of a third implementation of weaving weft yarns having the FIG. 4 distribution with warp yarns.
Figure 9A:
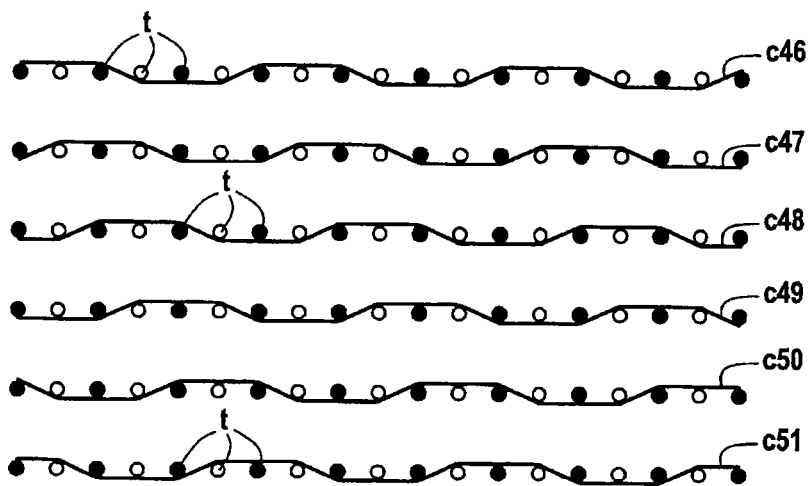
FIGS. 9A to 9D show the weaving patterns of FIG. 8 in greater detail.
Figure 9B:
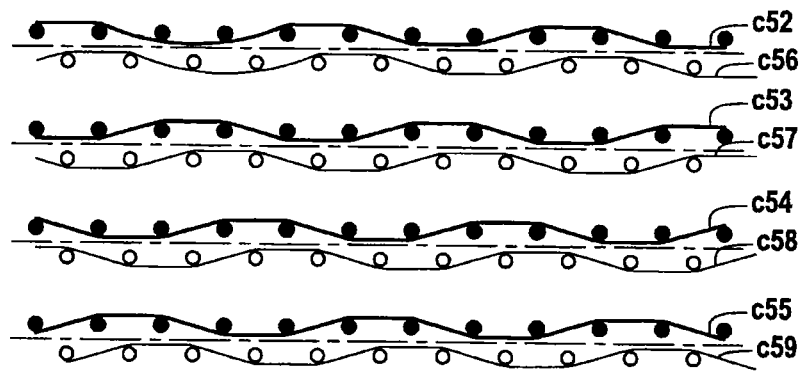
Figure 9C:
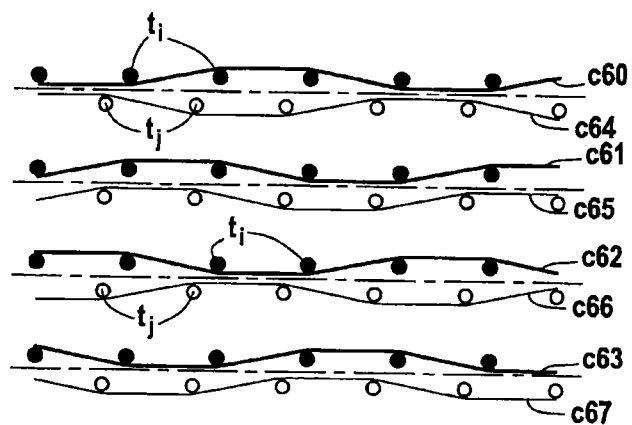
Figure 9D:
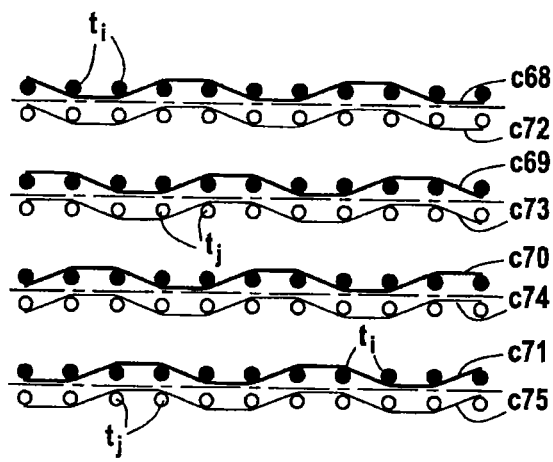

The warp yarns c42 to c45 in this section are woven with an interlock type weave for which four different weave planes are necessary in order to describe the weave pattern in full (see FIG. 7D). The resulting fabric thus has a single layer of warp yarns and two layers of weft yarns interlinked by an interlock type weave.

FIGS. 8 and 9A to 9D show a third implementation for interlinking the warp and weft yarns of each layer of yarns forming the fiber structure in accordance with the invention.

In this third implementation, the weft yarns of each layer of fabric are woven with warp yarns to form two subsets that are dissociated, with the exception of the section S1 corresponding to the large diameter D1 of the fiber structure, in which the weft yarns are interlinked with the warp yarns to form only one layer.

In the section S1 of the fiber structure (corresponding to its large diameter), the weft yarns t are thus interlinked by a single layer of warp yarns c46 to c51. The resulting fabric thus has a single layer of weft yarns and a single layer of warp yarns.

More precisely, in the example shown, the warp yarns c41 to c51 are woven in this section with a three-up, three-down serge weave (six successive weave planes are shown in FIG. 9 in order to describe this weave pattern in full). This weaving example also corresponds to that described with reference to section S1 in FIG. 5.

In the section S2 of the fiber structure, the weft yarns are distributed in two distinct subsets of weft yarns $t_i$ and $t_j$ that are interlinked by two mutually independent layers of warp yarns, respectively c52 to c55 and c56 to c59. A fabric is thus obtained having two independent layers of weft and warp yarns. The weave selected for the section S2 is a two-up, two-down serge (four different weave planes are needed to describe this weave pattern in full—see FIG. 9B).

In the section S3, the weft yarns are closer together but still distributed in two distinct subsets of weft yarns $t_i$ and $t_j$ that are interlinked by two mutually independent layers of warp yarns, respectively c60 to c63 and c64 to c67. A fabric is thus obtained having two independent layers of weft and warp yarns. The weave selected is still a two-up, two-down serge (see FIG. 9C).

Finally, in the section S4 corresponding to the small diameter of the fiber structure, the weft yarns $t_i$ and $t_j$ distributed in two superposed thicknesses of yarns are independently interlinked by two layers of warp yarns, respectively c68 to c71 and c72 to c75. A fabric is obtained having two independent layers of weft and warp yarns. The weave selected is likewise a two-up, two-down serge (see FIG. 9D).

Naturally, other implementations for interlinking the weft yarns of each layer of yarns forming the fiber structure of the invention could be envisaged.

In particular, the weft yarns of each layer of yarns may be woven equally well to form one or more independent layers depending on requirements. In particular, when the fiber structure is to be deformed geometrically in order to form fiber reinforcement for an aircraft wheel-half, for obvious reasons of manipulating the fiber structure, it is appropriate to form two independent layers of weft yarns in the section S4 corresponding to the small diameter of the fiber structure.

Furthermore, the weaves selected for each layer of weft yarns may vary between the various sections of the fiber structure and they are not limited to the particular examples described above. Other weave patterns such as a satin weave could be envisaged. Reference may be made in particular to Document WO 2006/136755, which gives various illustrations thereof.

For the sections of the fiber structure lying between the large diameter and the small diameter, it is nevertheless preferable to use a weave for which the interlinking of the warp and weft yarns in the thickness of the layers of yarns enables yarn lengths to be balanced over a complete weave pattern, so as to make equivalent relative slips possible during the geometrical deformations between the fiber structure state (FIG. 2) and the fiber reinforcement state (FIG. 3). It is thus often preferable to use weaves of the N-up, N-down serge type or of the plain type, rather than satin type weaves or N-up, M-down serge type weaves.

For the conical sections and the connections with the cylindrical surfaces, it is preferable to use weave patterns with balanced shrinkage, at least for the weft yarns. For the cylindrical sections of small diameter, it is preferable to use weave patterns with balanced shrinkage, at least for the warp yarns.

Furthermore, it is possible in the weaving of the fiber structure of the invention to use yarns of different weights in different locations of the structure. Thus, the weft yarns may be of the same weight or of different weights, e.g. between those located beside the inside face and those located beside the outside face of the corresponding layer of fabric. Likewise, the warp yarns may be of the same weight or of different weights, e.g. within a single weave of interlock type or as a function of two independent layers of warp yarns.

Finally, when the ratio D1/D0 between the large diameter D1 and the small diameter D0 of the frustoconical portion of the fiber structure is selected to be greater than 2, the angular distribution of the weft yarns in all of the sections of the frustoconical portion of the fiber structure will be different from that shown in FIG. 4. Typically, if the ratio D1/D0 is equal to 2.5, the weft yarns of a given layer of yarns that are distributed over the section S4 corresponding to the small diameter of the fiber structure will be distributed angularly on three different diameters to form 2.5 superposed plies. Likewise, if the ratio D1/D0 is equal to 3, the weft yarns in this section S4 will be distributed in three superposed plies, etc. The way in which these weft yarns are interlinked by the warp yarns remains identical to the various implementations described above.

The invention claimed is:

1. A single-piece woven fiber structure for fabricating an axisymmetric part of varying diameter made out of composite material, the fiber structure having a portion of frustoconical shape with a large diameter and a small diameter, the ratio between the large diameter and the small diameter being not less than 2, the fiber structure being formed by winding layers of warp and weft yarns that are woven on a mandrel having a profile that is defined as a function of the profile of the part to be fabricated with warp yarn take-up, the structure wherein for each layer of warp and weft yarns, the weft yarns are distributed angularly on a single diameter in a zone of the large diameter of the portion of frustoconical shape of the fiber structure and on at least two different diameters in a zone of the small diameter of the portion of frustoconical shape of the fiber structure in order to form at least two superposed plies of weft yarns.

2. The fiber structure according to claim 1, wherein for each layer of yarns, the two plies of weft yarns distributed in the zone of the small diameter of the portion of frustoconical shape are interlinked by a single layer of warp yarns.

3. The fiber structure according to claim 2, wherein the warp yarns interlinking two plies of weft yarns distributed in the zone of the small diameter of the portion of frustoconical shape are woven using an interlock type weave.

4. The fiber structure according to claim 1, wherein, for each layer of yarns, each of the plies of weft yarns distributed in the zone of the small diameter of the portion of frustoconical shape is interlinked by a single layer of warp yarns.

5. The fiber structure according to claim 4, wherein the warp yarns interlinking each ply of weft yarns distributed in the zone of the small diameter of the portion of frustoconical shape are woven using a weave of plain, serge, or satin type.

6. The fiber structure according to claim 1, wherein, in each layer of yarns, the weft yarns distributed in the zone of the large diameter of the portion of frustoconical shape are interlinked by a single layer of warp yarns.

7. The fiber structure according to claim 6, wherein the warp yarns interlinking the weft yarns distributed in the zone of the large diameter of the portion of frustoconical shape are woven using a weave of plain, serge, or satin type.

8. The fiber structure according to claim 1, wherein, for each layer of yarns, the weft yarns distributed in the zone of the large diameter of the portion of frustoconical shape are interlinked by two independent layers of warp yarns.

9. The fiber structure according to claim 8, wherein the warp yarns interlinking the weft yarns distributed in the zone of the large diameter of the portion of frustoconical shape are woven using a weave of plain, serge, or satin type.

10. The fiber structure according to claim 1, wherein, for each layer of yarns, the weft yarns distributed between the large diameter and the small diameter of the portion of frustoconical shape of the fiber structure are interlinked by one or more layers of warp yarns.

11. The fiber structure according to claim 10, wherein the warp yarns in a given layer of warp yarns interlinking weft yarns between the large diameter and the small diameter of the portion of frustoconical shape are woven using a weave of plain or serge type.

12. A part made of composite material having fiber reinforcement densified by a matrix, wherein the fiber reinforcement is formed by a fiber structure according to claim 1.

13. The part according to claim 12, constituting an aircraft wheel-half.

14. A method of weaving as a single piece a fiber structure according to claim 1, the method comprising winding a plurality of layers of warp and weft yarns on a mandrel having a profile that is defined as a function of the profile of the part to be fabricated with warp yarn take-up.

* * * * *